US006898936B1

(12) United States Patent
Ochs et al.

(10) Patent No.: US 6,898,936 B1
(45) Date of Patent: May 31, 2005

(54) COMPRESSION STRIPPING OF FLUE GAS WITH ENERGY RECOVERY

(75) Inventors: Thomas L. Ochs, Albany, OR (US); William K. O'Connor, Lebanon, OR (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/309,251

(22) Filed: Dec. 4, 2002

(51) Int. Cl.[7] .............................................. F01K 25/06
(52) U.S. Cl. ............................. 60/649; 60/646; 60/657; 60/671
(58) Field of Search .......................... 60/646, 649, 651, 60/657, 671

(56) References Cited

U.S. PATENT DOCUMENTS

| | | | |
|---|---|---|---|
| 2,677,236 A | | 5/1954 | Grinstead |
| 3,736,745 A | | 6/1973 | Karig |
| 4,126,000 A | | 11/1978 | Funk |
| 4,148,185 A | | 4/1979 | Somers |
| 4,487,139 A | | 12/1984 | Warner |
| 4,498,289 A | | 2/1985 | Osgerby |
| 4,788,824 A | * | 12/1988 | Spurr et al. .................... 60/671 |
| 5,132,007 A | * | 7/1992 | Meyer et al. ................. 208/427 |
| 5,175,995 A | | 1/1993 | Pak et al. |
| 5,467,722 A | | 11/1995 | Meratla |
| 5,480,619 A | | 1/1996 | Johnson et al. |
| 5,567,215 A | | 10/1996 | Bielawski et al. |
| 5,582,807 A | | 12/1996 | Liao et al. |
| 5,607,011 A | | 3/1997 | Abdelmalek |
| 5,724,805 A | | 3/1998 | Golomb et al. |
| 5,819,522 A | * | 10/1998 | Tops.o slashed.e .......... 60/780 |
| 5,846,301 A | | 12/1998 | Johnson et al. |
| 6,187,465 B1 | * | 2/2001 | Galloway ..................... 429/17 |
| 6,196,000 B1 | | 3/2001 | Fassbender |
| 6,202,574 B1 | | 3/2001 | Liljedahl et al. |
| 6,269,624 B1 | | 8/2001 | Frutschi et al. |

* cited by examiner

*Primary Examiner*—Hoang Nguyen
(74) *Attorney, Agent, or Firm*—Mark F. LaMarre; Thomas G. Anderson; Paul A. Gottlieb

(57) ABSTRACT

A method of remediating and recovering energy from combustion products from a fossil fuel power plant having at least one fossil fuel combustion chamber, at least one compressor, at least one turbine, at least one heat exchanger and a source of oxygen. Combustion products including non-condensable gases such as oxygen and nitrogen and condensable vapors such as water vapor and acid gases such as $SO_X$ and $NO_X$ and $CO_2$ and pollutants are produced and energy is recovered during the remediation which recycles combustion products and adds oxygen to support combustion. The temperature and/or pressure of the combustion products are changed by cooling through heat exchange with thermodynamic working fluids in the power generation cycle and/or compressing and/or heating and/or expanding the combustion products to a temperature/pressure combination below the dew point of at least some of the condensable vapors to condense liquid having some acid gases dissolved and/or entrained and/or directly condense acid gas vapors from the combustion products and to entrain and/or dissolve some of the pollutants while recovering sensible and/or latent heat from the combustion products through heat exchange between the combustion products and thermodynamic working fluids and/or cooling fluids used in the power generating cycle. Then the $CO_2$, $SO_2$, and $H_2O$ poor and oxygen enriched remediation stream is sent to an exhaust and/or an air separation unit and/or a turbine.

32 Claims, 4 Drawing Sheets

COMPRESSION STRIPPING OF FLUE GAS WITH ENERGY RECOVERY

CONTRACTUAL ORIGIN OF THE INVENTION

The United States Government has rights in this invention pursuant to employer/employee agreements between the U.S. Department of Energy (DOE) and the inventors.

BACKGROUND OF THE INVENTION

Pollutant removal is an integral part of all modern power plant designs. As the pollution control requirements become more stringent, the energy demands for capturing those pollutants become greater. Recirculating (recycling) flue gas with oxygen injection offers the potential for the efficient simultaneous removal of multiple pollutants and $CO_2$ in both retrofits and new power plants. In recirculation of flue gas, the combustion products which are normally sent up the smoke stack at a standard power plant, are recycled back into the boiler after the injection of sufficient oxygen to ensure that the fuel can burn in the mixed gas. A small portion of the flue gas (approximately ¼) is removed from the system. In our approach, this portion of the flue gas is then compressed and cooled to liquefy the condensables (predominantly $H_2O$ and $CO_2$).

There is significant energy required to compress flue gas. If the energy of compression is not minimized and partially recovered the power plant thermal efficiency will drop dramatically.

SUMMARY OF THE INVENTION

This invention relates to a method of applying energy saving techniques, during flue gas recirculation and pollutant removal, such that power generation systems can improve substantially in efficiency over those not employing the techniques revealed in this invention. In the case of a subcritical pulverized coal (PC) system without energy recovery, the performance can drop from 38.3% thermal efficiency (for a modern system without $CO_2$ removal) to as low as 20.0% (for the system with $CO_2$ removal and no energy recovery). A system according to one implementation of this invention can perform at 29.6% (with $CO_2$ removal) when energy recovery is included in the model design, but better efficiencies are probable. This invention is applicable to new construction, repowering, and retrofits.

In the invention, the power generation combustion systems recirculate (recycle) wet flue gas, condense $H_2O$, and acid gases such as $CO_2$, $SO_X$, and $NO_X$ and capture particulates. Using this invention, we remove multiple pollutants through the integrated condensation of $H_2O$ and $CO_2$ with entrainment of particulates and dissolution and condensation of other pollutants including $SO_2$. Consolidating the removal of pollutants into one process has the potential to reduce costs and reduce auxiliary power requirements. Non-condensable combustion products including oxygen, argon, and nitrogen are present in combustion products. Specifically, argon and nitrogen can come from the air separation process (remaining in the produced oxygen) and nitrogen can also be present in the fuel. Oxygen is normally supplied in excess to ensure complete combustion and therefore is found in the combustion products. Condensable vapors such as $H_2O$, $CO_2$, SOx, and NOx are produced in the combustion process and are the targets for condensation in this invention. When referring to combustion products in this invention it is assumed that these condensable vapors and non-condensable gases are present as well as particulats and other pollutants.

Specifically, this invention is directed to a method for remediating and recovering energy from combustion products from a fossil fuel power plant having at least one fossil fuel combustion chamber, at least one compressor, at least one turbine, at least one heat exchanger, and a source of oxygen (which could be an air separation unit). The fossil fuel power plant combustion products can include non-condensable gases such as oxygen, argon, and nitrogen; condensable vapors such as water vapor and acid gases such as $SO_X$ and $NO_X$; and $CO_2$ and pollutants such as particulates and mercury. The process of recovering energy during remediation, with recyded combustion products and added oxygen to support combustion, comprises changing the temperature and/or pressure of the combustion products by cooling and/or compressing and/or heating and/or expanding the combustion products to a temperature/pressure combination below the dew point of at least some of the condensable vapors. This is done in order to condense liquid having some acid gases dissolved and/or entrained therein and/or directly condensing the acid gases (such as $CO_2$ and $SO_2$) from the combustion products and to dissolve some of the pollutants therein thereby partially remediating the combustion products while recovering heat in the form of either sensible and/or latent heat from the combustion products through heat exchange between the combustion products and thermodynamic working fluids and/or cooling fluids used in the power generating cycle. Dissolve in the context of this invention means to entrain and/or dissolve. This process is repeated through one or more of cooling and/or compressing and/or heating and/or expanding steps with condensation and separation of condensable vapors and acid gases and recovery of heat in the form of either latent and/or sensible heat. The condensation reduces the energy required for continued compression by reducing mass and temperature, until the partially remediated flue gas is $CO_2$, $SO_2$, and $H_2O$ poor and oxygen enriched. Thereafter the $CO_2$, $SO_2$, and $H_2O$ poor and oxygen enriched remediation stream is sent to an exhaust and/or an air separation unit and/or a turbine. Whereby either or both of the energy of compression and the temperature of the expanded $CO_2$, $SO_2$, and $H_2O$ poor and oxygen enriched remediation stream is reduced. If the remediation stream is expanded through a turbine additional cooling condenses more of the remaining condensable vapors and expansion captures additional energy, or if the remediation stream is sent to an air separation unit additional condensable vapors are condensed and/or energy required for separation is reduced, or the $CO_2$ and $H_2O$ poor and oxygen rich remediation stream is exhausted to the atmosphere.

Preferably, not less than about 50% by volume of the combustion products are recycled to the combustor with sufficient make-up source of oxygen to maintain the volume of gas in the combustor substantially constant. Preferably, the source of oxygen added to the recycled combustion gases is not less than 40% pure oxygen and more preferably not less than 80% pure oxygen and most preferably not less than 98% pure oxygen. Ideally, a portion of the combustion products are removed and replaced with not less than about a stoichiometric amount of oxygen to support combustion of the combustion products. The added oxygen can be preheated by heat exchange with combustion products. The combustion products used to preheat the added oxygen may include the portion removed to be replaced by the added oxygen. The thermodynamic working fluid may be other than water. The thermodynamic working fluid can be one or more of hexane, ammonia, $CO_2$ or a halogenated hydrocarbon or other suitable working fluid. The fossil fuel combustion chamber is a boiler or a combustion turbine. The power generation cycle can be a steam turbine cycle. The thermodynamic working fluid used to cool the flue gas can be feedwater. As stated herein, the heat transferred can be sensible heat or latent heat; or both sensible and latent.

The steam turbine cycle may be a Rankine cycle, a regenerative cycle, or a reheat cycle or other steam turbine cycles.

The fossil fuel may be coal and the pollutants include fine particulate matter and/or heavy metals such as mercury. Alternatively, the fossil fuel may oil and the pollutants include tine particulate matter and/or heavy metals or other metals such as vanadium. Further, the fossil fuel is natural gas. Alternatively, the fossil fuel may be supplemented with biomass or biomass may be used in lieu of fossil fuel.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
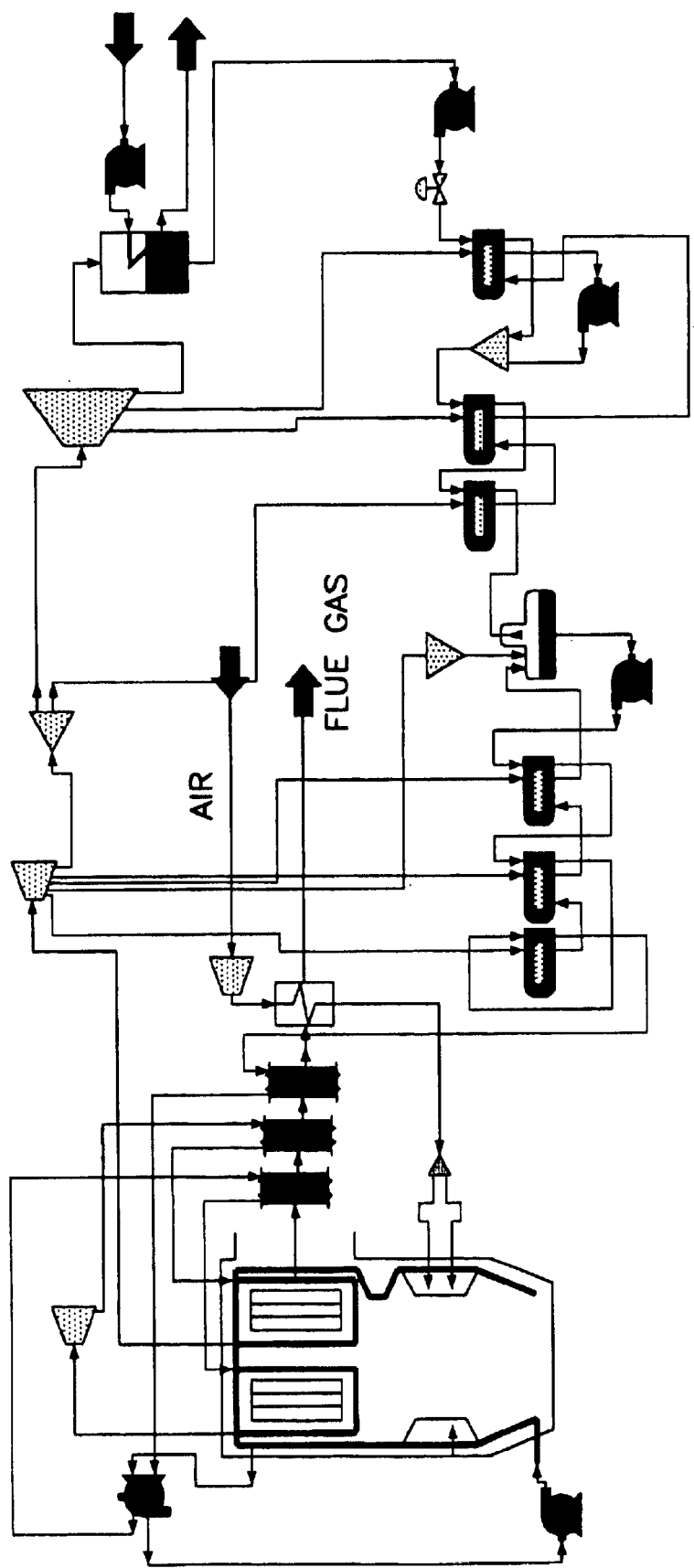
FIG. 1 is a schematic representation of a 400-MW Fossil Boiler System with no flue gas recirculation or compression removal of condensables. (Case 1a in the following descriptions)
Figure 2:
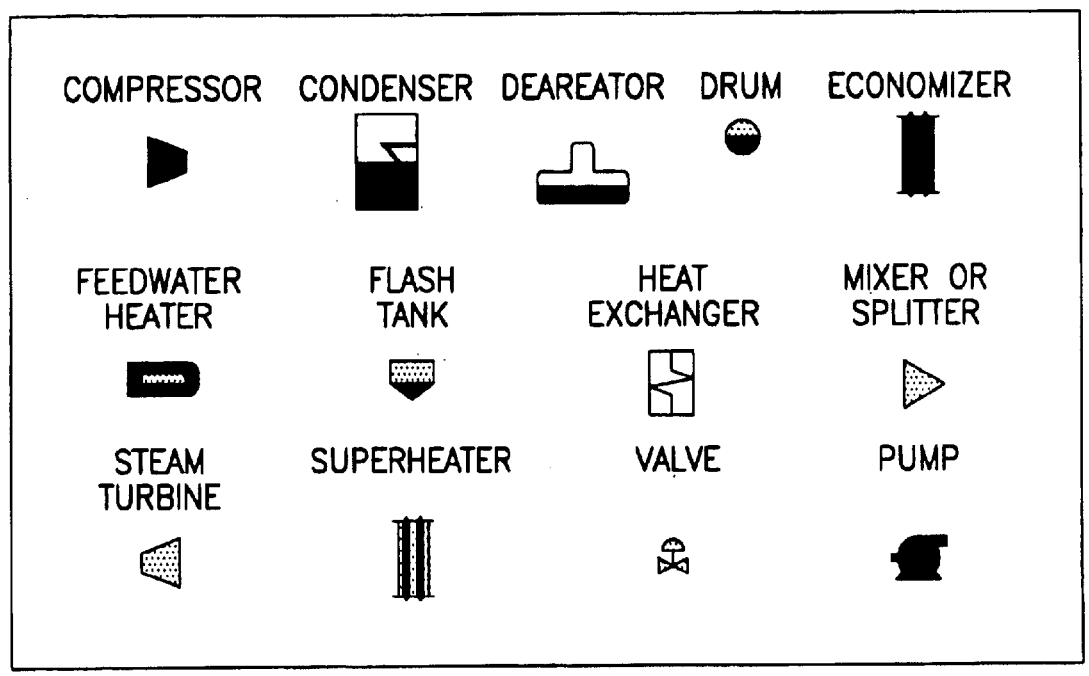
FIG. 2 is an illustration of the icons appearing in the FIGS. 1 and 3.

We have used computer modeling using GateCycle™ modeling software to examine energy recovery in two power plant designs which recover $CO_2$ and $SO_2$. The basic models include a subcritical single reheat PC unit (2,400 psi (16.55 MPa), 1,004° F. (540° C.), 1,004° F. (540° C.)) see FIG. 1, and a mildly supercritical double reheat PC unit (3,500 psi (24.13 MPa), 1,050° F. (566° C.), 1,050° F. (566° C.), 1,050° F. (566° C.)). The $CO_2$ in the flue gas is removed and converted to liquid (or supercritical fluid) form at pressures suitable for transmission through a pipeline (2,000–5,000 psi (13.8–34.5 MPa). While this modeling effort examined standard subcritical and supercritical systems, there is no reason to restrict these principles to the two configurations studied here. The design of the subcritical unit is based on an example model provided with the power plant modeling software (GateCycle™).

The supercritical power generation unit model was developed based on the heat balance in a USDOE/EPRI sponsored report prepared by Parsons. The supercritical model is similar in layout to the subcritical model with the addition of an extra reheat cycle and a total of 10 feedwater heaters corresponding to case 7c in the Parsons report (Owens, W., Buchanan, T., DeLallo, M., Schoff, R., White, J., Wolk, R., Evaluation of Innovative Power Plants with $CO_2$ Removal, Sponsored by USDOE/EPRI Report 1000316, Prepared by Parsons Energy and Chemicals Group Inc. and Wolk Integrated Technical Services, http://www.netl.doe.gov/coalpower/gasification/30 publications.htm.), which is incorporated by reference.

Hereafter are 11 models of pulverized coal power plants, divided into two "Types" (categories designating subcritical for type 1 and supercritical for type 2). The two types include 8 comparison "cases" (subcategories) and three "special" cases (Table 1 and Table 2). The cases are designed to demonstrate the results of adding energy recovery technologies and $CO_2$ capture to standard power plants. The tables illustrate the changes to the power generation systems and later tables relate the changes in the system to changes in performance. In the "comparison" cases ("a" through "d") the technology used in the two types can be directly compared. In those comparison cases ("a" through "d") there is a progressive addition of technologies to demonstrate the effect of changes in the power plant design and the changes were implemented in both types. In the "special" cases, the cases were modeled to investigate technology changes and are not repeated between the types. Specifically, in case 1e and case 1f there were minimal attempts at energy recovery, resulting in the worst performance. In case 2e all of the techniques of energy recovery used in the comparison cases as well as the use of turbo expansion to improve $CO_2$ recovery were applied, resulting in the best performance in terms of specific energy required to remove $CO_2$.

Both the subcritical and supercritical power plants were modeled using "wet flue gas recirculation." However, dry flue gas recirculation could be used as an alternative approach to the invention as will be well known to those skilled in the art. In wet recirculation, moisture is retained in the recirculated portion of the flue gas and the temperatures throughout the recirculation system are kept above the dew point. In dry flue gas recirculation, the temperature of the recycled flue gas is reduced enough to condense water vapor from the recycled flue gas and reduce the humidity of that recycled flue gas. In the models, condenser pressure was maintained at 1 psia (6.89 kPa) and ambient temperature was kept constant at 59° F. (15° C.). Input in the form of chemical thermal power ($3.57 \times 10^9$ BTU/hr (1,046 MW)) and fuel type (Illinois #6 seam, Old Ben Mine #26) is kept constant in these models as the technology of the power plant is varied. Maintaining constant fuel flow keeps the oxygen flow constant and therefore the power required to produce oxygen is constant for each case studied (assuming the use of the same oxygen generation technology). The choice of fuel (coal) was made to maintain consistency with other modeling efforts for direct comparison, to reflect the use of our most abundant fossil fuel source, and to demonstrate application of the technology on a carbon rich fuel source. In these models the source of oxygen is assumed to be a cryogenic air separation unit (ASU) producing approximately 330 ton/hr (299 metric ton/hr) of 98% pure $O_2$ consuming approximately 0.25 MWh/ton for a constant additional auxiliary load of 82.5 MW. Clearly, other forms of oxygen supply could be substituted for cryogenic air separation by those skilled in the art. The fuel feed rate (and therefore the oxygen flow rate) was determined for a conventional pulverized coal power plant with single reheat and a net rating of approximately 400 MW at a flue gas $O_2$ concentration of 3.5% on a wet basis. The $O_2$ content of the recycling flue gas was kept at approximately 21% by volume after $O_2$ injection to support combustion. In this patent the term "flue gas" is used for combustion products even if they do not go up a conventional flue.

The energy recovery processes have been incrementally added in the models to assess their potential for energy savings with no attempt at optimization. There has been no attempt to model the potential recovery of latent heat from the $CO_2$ during liquefaction, however, it should be apparent to those skilled in the art that a portion of the latent heat of $CO_2$ condensation could be recovered in a low temperature bottoming cycle or through other methods.

In both type 1 and type 2, the first four cases (a through d) are similar in the types of compression and energy recovery included in the models. This facilitates observation of the similarities and differences between subcritical and supercritical systems. Cases 1e and 1f were included to demonstrate how a lack of energy recovery can severely reduce the performance of a power plant capturing $CO_2$. Case 2e adds turbo expansion to the exhaust (the portion of the non-recirculated flue gas that is released) stream after most of the $H_2O$ and $CO_2$ has been condensed out of the exhaust stream.

TABLE 1

Conditions for the model cases for both sub-critical and super-critical.

| | Recirculation with $O_2$ injection. | Sensible heat | Moisture Latent heat | Compressor pre and intercooling |
|---|---|---|---|---|
| Type 1 (subcritical) | | | | |
| Case 1a | ○ | ○ | ○ | No Compression |
| Case 1b | X | ○ | ○ | No Compression |
| Case 1c | X | X | X | No Compression |
| Case 1d | X | X | X | X |
| Type 2 (supercritical) | | | | |
| Case 2a | ○ | ○ | ○ | No Compression |
| Case 2b | X | ○ | ○ | No Compression |

TABLE 1-continued

Conditions for the model cases for both sub-critical and super-critical.

| | Recirculation with $O_2$ injection. | Sensible heat | Moisture Latent heat | Compressor pre and intercooling |
|---|---|---|---|---|
| Case 2c | X | X | X | No Compression |
| Case 2d | X | X | X | X |

The exhaust gas stream is compressed to approximately 5,000 psia (34.47 MPa) and cooled to below the critical temperature for $CO_2$ (87.90 F (31.05° C.)) to condense the $CO_2$ from the flue gas. The resulting gas stream, after the removal of the $H_2O$, $CO_2$ and $SO_2$, is rich in $O_2$ and can be sent to the ASU as a high-quality feed stream to augment the incoming air and improve the efficiency of the ASU or can be exhausted to the atmosphere.

TABLE 2

Conditions for special cases

| | Recirculation with $O_2$ injection. | Sensible heat | Moisture Latent heat | Compressor pre and intercooling |
|---|---|---|---|---|
| Type 1 Special Cases | | | | |
| Case 1e | X | ○ | ○ | X |
| Case 1f | X | ○ | ○ | ○ |
| Type 2 Special Case | | | | |
| Case 2e | X | X | X | X |

Results for all 11 cases are summarized in Table 3, Table 4 and Table 5. The results for Case 1a and Case 2a (base cases) show starting heat rates of 8,907 BTU/kWh and 8,364 BTU/kWh respectively. For Case 2a, the results are within 0.7% of the heat rate results obtained by Parsons (8,421 BTU/kWh) in their Case 7c showing the similarity of the results using two different types of modeling software and two different modeling approaches.

In Table 3, Table 4, and Table 5, the 'PGU' (Power Generation Unit) power represents the total power produced subtracting any auxiliary loads (or adding gains) from processes such as flue gas recirculation, flue gas compression, cooling, and other auxiliary loads, but not considering the power consumed by the ASU. The "net" plant power is determined by subtracting the energy requirements for the ASU (82.5 MW for all cases) from the PGU power.

TABLE 3

Comparison of performance of sub-critical PC model cases

| Type 1 | PGU HHV Thermal Efficiency (%) | PGU HHV Heat rate (BTU/kW) | PGU Power (MW) | Net HHV Thermal Efficiency (%) | Net HHV Heat rate (BTU/kWh) | Net Power (MW) | $CO_2$ Exhausted (lb/hr) | $CO_2$ removed (%) |
|---|---|---|---|---|---|---|---|---|
| Case 1a | 38.3 | 8,907 | 400.8 | 38.3 | 8,907 | 400.8 | 717,600 | 0 |
| Case 1b | 39.3 | 8,672 | 411.7 | 31.1 | 10,845 | 329.2 | 717,600 | 0 |

TABLE 3-continued

Comparison of performance of sub-critical PC model cases

| Type 1 | PGU HHV Thermal Efficiency (%) | PGU HHV Heat rate (BTU/kW) | PGU Power (MW) | Net HHV Thermal Efficiency (%) | Net HHV Heat rate (BTU/kWh) | Net Power (MW) | CO$_2$ Exhausted (lb/hr) | CO$_2$ removed (%) |
|---|---|---|---|---|---|---|---|---|
| Case 1c | 40.2 | 8,485 | 420.7 | 32.3 | 10,555 | 338.2 | 717,600 | 0 |
| Case 1d | 37.5 | 9,091 | 392.7 | 29.6 | 11,508 | 310.2 | 17,390 | 97.6 |

Table 3 and Table 5 show that the subcritical model thermal efficiency can range from a high value of 38.3% (Case 1a, base case without recirculation) to as low as 20.0% (See Table 5) for the same PGU components by adding flue gas recycling and oxygen injection with no attempt at energy recovery (special case 1f). Thermal efficiency increases to 29.6% when effective heat recovery is used (Case 1d in Table 3). Special cases 1e and 1f were included in this modeling effort to illustrate the severe penalty for not including flue gas energy recovery and/or intercooling during compression.

sensible and latent heat content. In a plant that recycles the flue gas, a significantly smaller stream of flue gas goes up the stack (or is further treated). In the models used to develop these cases approximately 77% of the combustion products are recirculated (retaining the energy that would otherwise be lost as both latent and sensible heat). The difference between the "b" and "c" cases (in both Types 1 and 2) is mostly the use of wet heat exchange using feedwater as the primary cooling fluid in the cases to capture both sensible and latent heat from the 23% of the flue gas leaving the gas recirculation system. Water vapor in the flue gas of a

TABLE 4

Comparison of performance of super-critical PC model cases

| Type 2 | PGU HHV Thermal Efficiency (%) | PGU HHV Heat rate (BTU/kWh) | PGU Power (MW) | Net HHV Thermal Efficiency (%) | Net HHV Heat rate (BTU/kWh) | Net Power (MW) | CO$_2$ Exhausted (lb/hr) | CO$_2$ removed (%) |
|---|---|---|---|---|---|---|---|---|
| Case 2a | 40.8 | 8,364 | 426.8 | 40.8 | 8,364 | 426.8 | 717,600 | 0 |
| Case 2b | 41.9 | 8,140 | 439 | 34 | 10,014 | 356.5 | 717,600 | 0 |
| Case 2c | 42.6 | 8,000 | 446 | 34.7 | 9,821 | 363.5 | 717,600 | 0 |
| Case 2d | 40.4 | 8,446 | 422.7 | 32.5 | 10,494 | 340.2 | 16,500 | 97.7 |

Table 4 Case 2d shows that a mildly supercritical system could operate near 32.5% HHV thermal efficiency after considering the penalty for oxygen production using existing cryogenic O$_2$ production technology. The PGU values were included in the tables to highlight the relatively small changes in the performance of the generation units when the energy demand of the O$_2$ production is not considered.

standard PC power plant ranges from approximately 8% to 12% by volume. In systems using wet recycle the water vapor content can be in the ranges from approximately 20% to approximately 40% by volume. Nitrogen is the predominant constituent in once-through systems while, in the recirculation systems, CO$_2$ and H$_2$O form the majority of the flue gas. Both CO$_2$ and H$_2$O are condensable vapors.

TABLE 5

Performance of special cases

| | PGU HHV Thermal Efficiency (%) | PGU HHV Heat rate (BTU/kW) | PGU Power (MW) | Net HHV Thermal Efficiency (%) | Net HHV Heat rate (BTU/kWh) | Net Power (MW) | CO$_2$ Exhausted (lb/hr) | CO$_2$ removed (%) |
|---|---|---|---|---|---|---|---|---|
| Case 1e | 29.7 | 11,482 | 310.9 | 21.8 | 15,630 | 228.4 | 15,690 | 97.8 |
| Case 1f | 27.9 | 12,231 | 291.9 | 20 | 17,051 | 209.4 | 16,825 | 97.7 |
| Case 2e | 40.4 | 8,447 | 423.1 | 32.6 | 10,482 | 340.6 | 6,100 | 99.1 |

The PGU heat rates for Cases 1a, 1b, and 1c as well as Cases 2a, 2b, and 2c, demonstrate that the heat rates actually dropped for each type of power plant when flue gas recirculation was used (Table 3 and Table 4). Improvement in the PGU heat rate, when going from the "a" cases to the "b" cases, is mostly due to the reduction in stack losses through recycling of the flue gas. In a normal power plant the combustion products are sent up the stack, losing both An example of the difference in the composition of the flue gas between no recirculation (case 2a) and recirculation case 2e (Table 6) shows that the conventional flue gas H$_2$O content is approximately 8.3% by volume while the H$_2$O content in the flue gas exiting the boiler in the recycled case is approximately 32.7% by volume. The O$_2$ content of the recirculated flue gas entering the boiler was maintained at approximately 21% by simulating injection of 98% pure O$_2$.

TABLE 6

Flow information for Case 2a versus Case 2e.

|  | Case 2a Flue gas | Case 2e | | | |
| --- | --- | --- | --- | --- | --- |
|  |  | Flue gas exiting boiler | Incoming $O_2$ | Flue gas reentering boiler | Exhaust |
| Flow (lb/hr) | 3,642,100 | 4,154,248 | 658,668 | 3,878,210 | 51,700 |
| $CO_2$ (vol) | 0.1368 | 0.6085 | 0 | 0.4972 | 0.085 |
| $O_2$ (vol) | 0.035 | 0.035 | 0.98 | 0.2079 | 0.576 |
| $N_2$ (vol) | 0.7345 | 0.0206 | 0.02 | 0.0205 | 0.339 |
| $H_2O$ (vol) | 0.0829 | 0.3269 | 0 | 0.2671 | 1E-04 |
| $SO_2$ (vol) | 0.002 | 0.009 | 0 | 0.0073 | 0 |

Figure 3A:
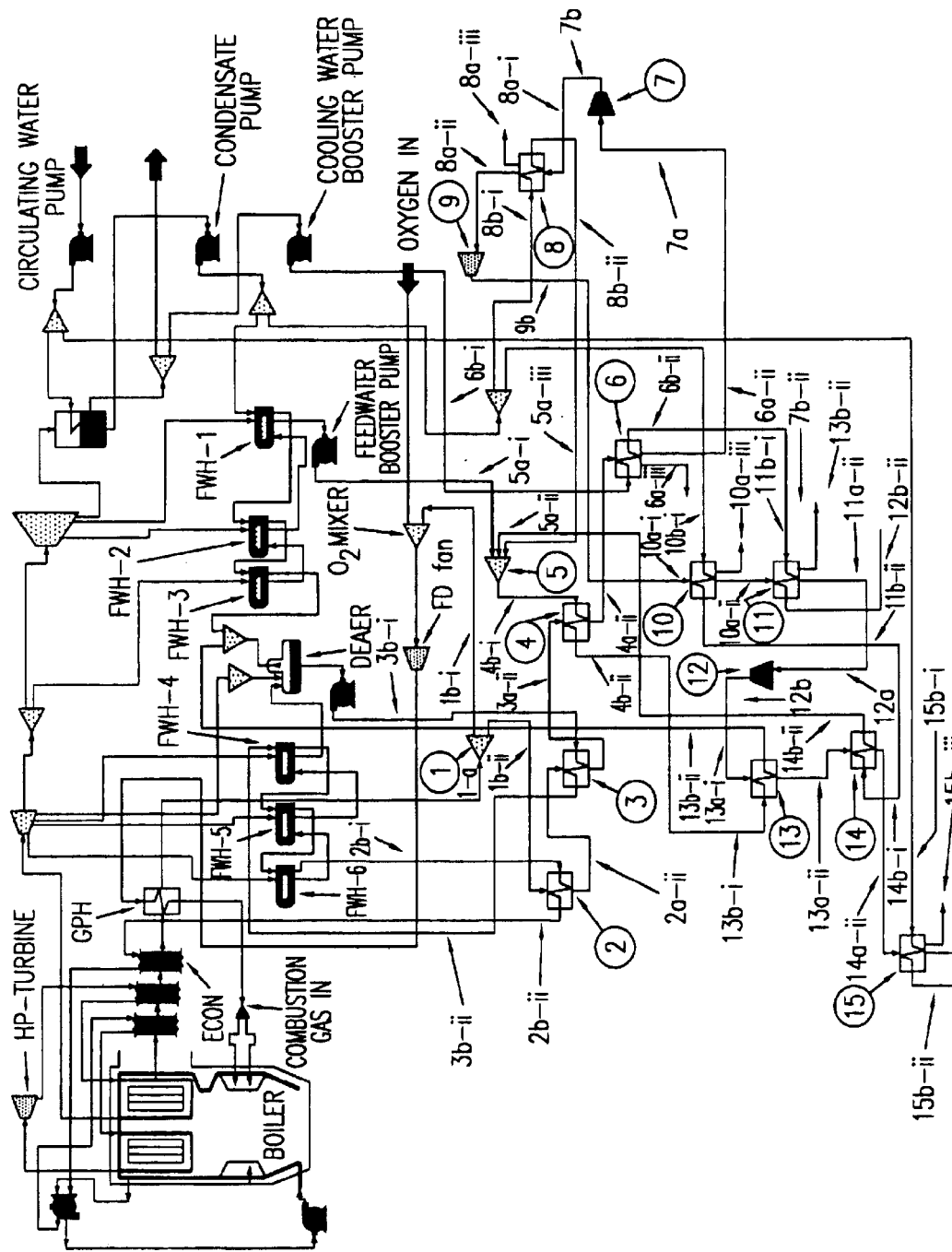
FIGS. 3a and 3b is a schematic representations of a system for practicing the invention.
Figure 3B:
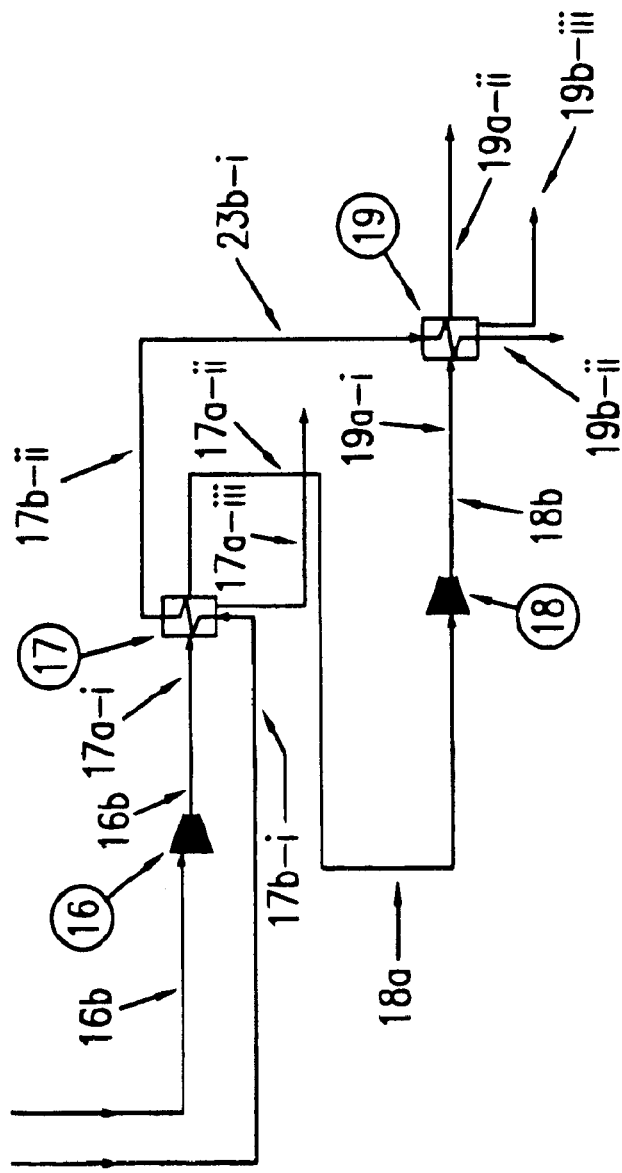

In FIGS. 3a and 3b, the flue gas is represented by the line coming out of the upper right side of the boiler and passing through two primary superheaters, then through the economizer, and finally through a gas preheater (GPH) before being split into two streams. One stream of the split flue gas then passes through a heat exchanger and then through three stages of compression, through another heat exchanger where water is removed and the compressed gas then is split into condensable streams of $CO_2$ and $H_2O$ which are treated and the residual exhaust is sent to the stack. The compressed gas stream composition is shown in Table 6 before removal of $H_2O$ (Case 2e Flue gas exiting boiler) and after the removal of $H_2O$ and a significant portion of the $CO_2$ (Case 2e exhaust). The water vapor (approximately 156,600 lbs/hr) contains latent heat (approximately 1000 BTU/1b) totaling approximately 46 MW. Condensing the $H_2O$ using feedwater (or other suitable cooling fluid) captures a portion of the latent heat which is returned to the boiler. The flue gas could be compressed in stages with cooling before each stage (intercooling) and moisture condensation taking place during intercooling. In addition to the condensed water removed from the flue gas, in our experiments, there are also entrained and dissolved streams of approximately 15,400 lbs/hr of $SO_2$ (and $SO_3$), other soluble combustion products, and insoluble particulates. The opportunity to remove contaminants in the gas stream at the same time as the removal of the water allows us but does not compel us to combine the processes of multi-pollutant removal, wet-heat exchange, and preparation for $CO_2$ condensation.

High-moisture content fuels such as western coals are good examples of fuels that can produce significantly more useful energy through wet heat exchange. Any fuel source with significant hydrogen can gain from wet heat exchange. Fuels such as natural gas (with a high hydrogen to carbon ratio) as well as petroleum products benefit significantly by using wet heat exchange.

If a significant portion of the water vapor is removed prior to compression, the compressor performs less work on the flue gas. Power consumed during compression varies directly with the mass being compressed and the absolute suction temperature and varies inversely with the molecular weight. The exhaust portion of the flue gas can be cooled by the same water used for cooling the turbine condenser. This is a good approach from the standpoint of reducing compressor work at the first stage through cooling. However, it neither reuses the heat from the flue gas in the feedwater nor reduces the work of later compression stages. A better approach is to use the feedwater to cool the combustion products before each compression stage. The circulating water can then be used to further cool the exhaust gas below the temperature of the feedwater.

The condensate exits the condenser at approximately 100° F. (37.7° C.), which allows it to cool the uncompressed exhaust flue gas to below the dew point and to condense a significant portion of the water vapor. The cool incoming $O_2$ stream can also cool the exhaust flue gas before the feedwater heat exchanger. That increases the temperature of the incoming $O_2$ to near that of the recirculated flue gas and also reduces the energy needed to drop the exhaust flue gas temperature to below the dew point.

If this first condensation is performed at flue gas pressures (near atmospheric), the mass of the exhaust flue gas is reduced, prior to compression, by the mass of the condensates (which includes both water and acid gases). For Case 2e the mass of condensed water is approximately 145,000 lb/hr. The reduction in mass allows the initial compressor stage to work less. The exhaust flue gas stream is further cooled by using circulating water, after initial cooling using feedwater.

After the first condensation, the system compresses the exhaust stream to approximately 180 psia (1.24 MPa). The temperature of the compressed gas is approximately 500° F. (260° C.) and the exhaust stream can be cooled again in wet heat exchange with first the feedwater and then the circulating water, thus condensing another 11,000 lb/hr of water vapor. At this point the mass of the exhaust flue gas has been reduced by approximately 171,000 lb/hr (including $SO_2$). The acid water stream with approximately 0.27 mole fraction of $SO_2$ (with $SO_3$) and other pollutants is then treated. The last column in Table 7 (Expansion 1) represents the exhaust stream that was first compressed to 5,000 psia (34.47 MPa), $CO_2$ was removed, then the exhaust stream was expanded to 2,000 psia (13.79 MPa), and more $CO_2$ was condensed. The composition in the last column is the composition of the stream leaving as exhaust. Energy is recovered by the turbo-expansion at the same time extra $CO_2$ is removed by dropping the temperature.

TABLE 7

Gas streams in case 2e showing composition, flow rate, and pressure.

| Gas composition is shown as mole fraction | Exhaust Flue gas | After first H$_2$O condensation | After second H$_2$O condensation Compression 1 | After first CO$_2$ condensation Compression 2 | After second CO$_2$ condensation Compression 3 | After third CO2 condensation Compression 4 and Expansion 1 |
|---|---|---|---|---|---|---|
| CO$_2$ | 0.6085 | 0.8711 | 0.9143 | 0.71 | 0.39 | 0.085 |
| O$_2$ | 0.035 | 0.0501 | 0.0526 | 0.1821 | 0.383 | 0.577 |
| N$_2$ | 0.0206 | 0.0294 | 0.0309 | 0.1069 | 0.2249 | 0.338 |
| H$_2$O | 0.3269 | 0.0365 | 0.0022 | 0.001 | 0.0021 | 0.0001 |
| SO$_2$ | 0.009 | 0.0129 | 0 | 0 | 0 | 0 |
| Pressure (psia) | 15 | 15 | 180 | 1,200 | 2,500 | 5,000 to 2,000 |
| Mass (lb.hr) | 935,000 | 789,000 | 762,000 | 207,000 | 87,800 | 51,700 |

The final exhaust after turbo-expansion is oxygen rich (0.5765 mole fraction) and compressed (2,000 psia). This makes an excellent feedstock for the ASU, reducing the energy requirement for separation slightly. More of the remaining CO$_2$ can be captured in the ASU, making this an effective approach to CO$_2$ capture.

The fluid flows from Case 2e are shown in Table 8. The water captures SO$_2$ (and SO$_3$) along with other water soluble combustion products and suspended particulates. The CO$_2$ is in liquid or supercritical fluid form and under pressure. These flow rates will vary with the fuel used, oxygen/fuel ratio, and other process parameters. The cases examined used a carbon rich coal with low moisture content and the ratio of water to CO$_2$ will change considerably for a Western coal. Since wet heat exchange takes place under different temperatures and pressures for the different condensates, it is necessary to ensure the fuel used is compatible with the heat exchange systems. While particulates and pollutants will be removed during the condensation processes this does not preclude the combination of this process with filters, separators, scrubbers, or other pollutant removal systems as is dictated by the particular fuel.

TABLE 8

Fluid flows

| | Case 2e |
|---|---|
| H$_2$O (lb/hr) | 157,600 |
| CO$_2$ (lb/hr) | 710,000 |
| SO$_2$ (lb/hr) | 15,400 |

The computer modeling results demonstrate that both subcritical and supercritical systems respond in a similar manner to changes which take advantage of energy recovery. Table 9 compares the PGU values found in Table 3 and Table 4. The incremental values for the change in heat rate, for the cases being examined, are found by subtracting each value from the preceding case. For example, the first incremental difference is found by subtracting the base case values (case a) from the values for case b. The next incremental value is found by subtracting the values from case b from the values from case c. The columns with the total values for the change in heat rate are determined by subtracting the base case value (case a) from the values of the case being examined. Since cases a through d added energy recovery processes, we can see from the incremental change, the effect of each process on heat rate. The columns showing the total change demonstrate the magnitude of the cumulative system changes. Table 9 illustrates that adding recirculation (not counting the oxygen load) we gain energy (lower heat rate) by reintroducing the flue gas energy into the combustion cycle.

Table 10 demonstrates that changes in the approach to energy recovery can produce significant differences in the amount of energy required to capture a ton of CO$_2$. As can be seen in Table 10, both Type 1 and Type 2 cases "d" exhibit similar energy cost per ton of CO$_2$ captured. It is also clear from examining the energy cost of capture for CO$_2$ in the Type 1 cases where there was no significant energy recovery (e and f), the cost of neglecting the opportunity to save energy shows up as a severe penalty.

TABLE 9

Comparison of cases with the base cases. (heat rates in BTU/kWh)

| Change | HHV PGU heat rate difference Type 1 Value (BTU/kWh) (Increment) | HHV PGU heat rate difference Type 2 Value (BTU/kWh) (Increment) | HHV PGU heat rate difference Type 1 Value (BTU/kWh) (difference) | HHV PGU heat rate difference Type 2 Value (BTU/kWh) (difference) | Case |
|---|---|---|---|---|---|
| Base Case | 8,907 | 8,364 | 8.907 | 8,364 | Case 1a & 2a |
| | 0 | 0 | 0 | 0 | |
| Add recirculation | 8,672 | 8,140 | 8.672 | 8,140 | Case 1b & 2b |
| | (−235) | (−224) | (−235) | (−224) | |

TABLE 9-continued

Comparison of cases with the base cases. (heat rates in BTU/kWh)

| Change | HHV PGU heat rate difference Type 1 Value (BTU/kWh) (Increment) | HHV PGU heat rate difference Type 2 Value (BTU/kWh) (Increment) | HHV PGU heat rate difference Type 1 Value (BTU/kWh) (difference) | HHV PGU heat rate difference Type 2 Value (BTU/kWh) (difference) | Case |
|---|---|---|---|---|---|
| Add wet heat exchange with no compression | 8,485 (−187) | 8,000 (−140) | 8,485 (−422) | 8,000 (−364) | Case 1c & 2c |
| Add compression with energy recovery | 9,091 (−606) | 8,446 (−446) | 9,091 (−184) | 8,446 (−82) | Case 1d & 2d |
| Special cases | | | | | |
| Add compression with compressor Intercooling | | | 11,482 (−2,575) | | Case 1e |
| Add compression without compressor Intercooling | | | 12,231 (−3,324) | | Case 1f |
| Compression with energy recovery and turbo expansion | | | | 8,437 (−73) | Case 2e |

TABLE 10

Power requirement for $CO_2$ captured in (MWhr/ton $CO_2$)

| Case | Type 1 | Type 2 |
|---|---|---|
| d | 0.259 | 0.247 |
| e | 0.491 | 0.242 |
| f | 0.546 | — |

Referring to FIG. 3, the system runs at approximately 383 MW with the same fuel input as previously discussed. Below is a description of each numbered component of FIG. 3.

First it is necessary to recognize that energy recovery is an important part of the operation of any power plant. The possibility of a requirement to remove $CO_2$ from the flue gas presents the possibility of power plant configurations that are inherently different from traditional power plant configurations. Because of the new configurations there is a possibility of inventing new ways to recover energy from the new configurations that have not been used in the past. This invention recognizes and identifies specific implementations of energy recovery based on these differences between conventional fossil fueled power generation systems and fossil fueled power generation systems using flue gas recirculation.

Specifically, the recirculation of flue gas and the addition of oxygen to enable the recycled flue gas to support combustion gives us a new configuration that allows us to capture energy in the power plant working fluids. Recirculation of flue gas is presently done on a small scale (a small portion of the flue gas can be sent back to the boiler) to help moderate temperatures in a boiler (boilers are sometimes referred to as steam generators). The type of recirculation proposed for $CO_2$ removal would be complete (or substantial) recirculation with a bleed stream taken off to make up for the volume of $O_2$ which must be injected to maintain combustion. Because of the possibility of complete recirculation, the energy balances in the boiler change dramatically.

Most of the flue gas is not discarded up the stack (the non-condensable part of the bleed stream can be) That means that the flue gas which is recirculated keeps its energy and that energy is recycled back into the boiler.

The chemical composition of the combustion products change dramatically from those common in standard boilers.

Processing of the bleed stream by condensation of the condensable gases makes latent heat available for energy recovery.

Processing of the compressed bleed stream makes both latent and sensible heat available for energy recovery.

This invention takes advantage of the change in chemical composition of the combustion products and the availability of new opportunities to recover both latent and sensible heat in the new combustion system configurations using flue gas recirculation. Simultaneously, the condensation of vapors reduces the compression work required to compress the remaining combustion products and lowering the temperature of the combustion products also reduces the compression work required. Herein, low pressure is used to refer to pressure which is low with respect to the rest of the circuit. In standard boilers the pressure is normally near atmospheric pressure. The pressure can be slightly negative in the case of an "induced draft fan" moving the combustion products or slightly positive in the case of a "forced draft fan" blowing the pre-combustion products into the boiler. There can also be a balanced draft mode in which there are both a forced draft fan and an induced draft fan. In the balanced draft system the pressure can be slightly positive, slightly negative, or neutral with respect to atmospheric pressure. There can also be pressurized systems that operate at boiler pressures up to several atmospheres. This "low pressure" section of the circuit would be a boiler pressure operating within a few atmospheres of atmospheric pressure and probably within a few inches of water pressure differential. In this section energy which is not available in conventional boiler flue gas, as explained below, is recovered in the feedwater (or other working fluids in the power generation system).

In FIGS. 3a and 3b (which represents only one of many possible implementations of this invention), the low pressure portion of the gas circuit could be considered to start at the point in the diagram labeled "combustion gas in." This is where the combustion gas (oxygenated recycled flue gas) is introduced to the boiler (possibly with the fuel) and thoroughly mixed with the fuel.

The combustion gas/fuel mixture is then combusted in the boiler heating water in the "water walls" within the "radiant zone" of a standard type boiler. In a combined cycle system the combustion takes place in a combustion turbine.

The combustion products (aka "exhaust gas" or "flue gas") then move through the "convection pass" of the boiler, superheating the steam that has been produced in the water walls or reheating steam which has been returned from the HP-turbine (high-pressure turbine) if this is a reheat system. There can be zero, one, or more reheat cycles. In this diagram the first portion of the convection pass where steam is superheated continues up to (but not including) the component labeled as "Econ."

Econ=Economizer. The economizer is designed to take more heat from the combustion products and heat the boiler feedwater up to near the boiling point (under pressure) as opposed to the superheaters which are adding heat to steam. In a conventional steam generator system, feedwater is brought from the last HP-feedwater heater (labeled FWH-6 in the diagram) directly to the economizer to pick up more heat. Because there is more energy in the combustion products in the flue gas recirculating system (because at this point they do not have to either heat the feedwater as much in the economizer or heat the incoming combustion gas as much in the GPH (Gas Pre-Heater) the gas still has enough energy to be used later to pre-condition the feedwater by more heating.

GPH—Gas Pre-Heater. This is usually referred to as an APH (Air Pre-Heater) however, since we are not heating air we refer to it as a "GPH." The designation could still be referred to as an APH as long as it is understood it is not air being heated, but a mixed combination of combustion products and $O_2$. The GPH does not have as much work to do as the normal APH because the incoming mixed gas has more energy than ambient air and does not require as much energy to heat.

Component "1": Splitter: (When numbers are used to denote components on the figure, they are referring to those components with numbers in a circle) This is a significant difference between a recirculation system and a once-through system. At this point in a standard system essentially all of the flue gas would be sent up the stack. However, it would also be at a significantly lower temperature since the combustion products would have lost more energy in the Econ and APH (GPH). In our invention, the combustion products are split into a main recirculated stream and a smaller bleed stream, which is further processed, to ensure that the total gas volume does not increase due to the injection of make-up oxygen. If the volume of the recirculated combustion products were allowed to increase or decrease we would have problems with the system total volume. The overall mass of the combustion products will be higher than the mass of the incoming combustion gas stream because the mass of the $H_2$, C, S and other combustible species are added to the gas stream as the fuel is burned. The majority of the combustion products go on to the mixer (labeled "$O_2$ mixer" in FIG. 3) where they are mixed with the incoming $O_2$ and then on to the FD-fan (forced draft fan) to be forced into the boiler with the fuel. Note. This could be either a forced draft fan here, or an induced draft fan in the exhaust stream or a combination for a balanced draft.

Component 2: Heat exchanger. This is part of the new invention that recovers heat into the high pressure feedwater before it goes to the Economizer. The ability to recover the heat in the high pressure feedwater after the GPH or APH is new to this configuration of recycled combustion gases. It has not been recognized by other researchers. It is due to the higher temperature of the gas leaving the GPH that this invention can take advantage of the temperature difference between the gas at this point and the relatively lower temperature of the feedwater. In a standard system without flue gas recirculation and oxygen injection the temperature of the gas leaving the APH would be lower than the HP-feedwater and could not be used to heat it. The combustion products leaving the GPH are at a higher temperature than in a conventional system because they have more residual energy than in a standard system. At this point the temperature of both the feedwater and the exhaust gas is higher than the dew point of the condensable gases so this exchanger would recover sensible heat only (in this version of the invention). Note that the configuration could vary from the one shown in that it could use the feedwater from FWH-5 or FWH-4 and we have chosen this configuration as an example of one possible part of the invention but other configurations could be used. The heat being recovered in this part of the system could be recovered in other parts of this invention if it is not recovered here, showing that the invention demonstrates recovery of the remaining energy in the combustion products at a number of locations in the flue gas circuit that are illustrated in these examples but not limited to these examples to those skilled in the art. This heat exchange is serving two purposes. First it is reducing the temperature of the combustion products so we will be able to condense vapors in the later stages of the system. Second it is recovering the heat from the temperature reduction of the combustion products into the feedwater.

Component 3: Heat exchanger. This is part of the new invention and recovers more sensible heat from the combustion product stream into the feedwater coming out of the deaerator. Again, this is an example of the temperature of the combustion products being high enough to transfer heat to the feedwater but still too high to condense vapors so only sensible heat is captured at this point. In a conventional system the temperature of the combustion products leaving the APH is too low to be used at this point in the cycle. Again, this heat exchange is serving two purposes. First it is reducing the temperature of the combustion products so we will be able to condense vapors later in the system. Second it is recovering the heat from the temperature reduction of the combustion products into the feedwater. In this case the feedwater is coming from deaerator (labeled "Deaer" In the drawing).

Component 4: Heat exchanger. This is part of the new invention and recovers more sensible heat from the combustion product stream into the feedwater coming out of the mixer #5. Again, this heat exchange is serving two purposes. First it is reducing the temperature of the combustion products so we will be able to condense vapors. Second it is recovering the heat from the temperature reduction of the combustion products into the feedwater. Although we do not show any condensate streams coming off at this point there is a possibility that, depending on the chemical composition of the fuel, high-boiling point vapors (such as sulfuric acid) will be condensing at this point.

Component 5: Mixer. This mixes feedwater that has been pre-heated in heat exchangers and sends it to component 4. The reason this is done is to regulate the temperature difference between the feedwater entering heat exchanger 4 and the combustion products entering the heat exchanger. This is a component which could be changed or even removed depending on the implementation.

Component 6: Heat exchanger. In order to condense as much vapor as possible at a given pressure it is necessary to decrease the temperature. This is the reason we have been choosing feedwater streams with decreasing temperatures as we have been removing energy from the gas stream. This is part of the new invention and recovers more heat from the combustion product stream into the feedwater coming out of heat exchanger 4. At this point we can expect a significant portion of the water vapor in the combustion gases to start condensing as well as the acid gases such as $H_2SO_4$ and $H_2SO_3$. This is a condensing wet heat exchanger and it will recover significant amounts of latent heat as well as sensible heat. In this exchanger, in this example implementation, approximately 67 ton/hr of water will condense as well as approximately 7 ton/hr of $H_2SO_4$ and $H_2SO_3$ for a total of approximately 74 ton/hr of liquid removed from the gas stream. This will reduce the work required of the compressor (component 7) since it will be compressing less mass as well as compressing gas at a lower temperature (both factors will reduce compression work). Other acid gases will partially condense in this condenser including the NOx based acids as well as $H_2SO_3$. Since there is a significant condensation of liquids in this exchanger there will also be a significant amount of particulates entrained in the condensing liquids (as well as nucleating condensation). This will serve as one step in removal of particulates from the gas stream. There might be a need for standard particulate removal equipment both upstream and downstream from this condenser, but they are not shown in the diagram since they are not germane to this invention.

The following section of the invention involves recovery of energy from the gas stream as it is compressed (which raises the temperature as well as the pressure).

Component 7: Compressor (first stage). The principle of removal of vapors through condensation relies on increasing the partial pressure of the vapor and lowering the temperature. The higher the partial pressure and the lower the temperature, the more condensable vapors will condense (once the dew point has been reached). At this point, we have already increased the partial pressure of $CO_2$ in the gas stream by removing $H_2O$ and other vapors such as $H_2SO_4$ in the condensations that have taken place so far. Here we increase the pressure which increases the partial pressure of all of the gas components. Our objective is to increase the partial pressure of the condensable gases so when we reduce the temperature they will condense. In this stage of compression the pressure of the gas in the example increases from approximately ambient to approximately 63.5 psia. This compression also increases the temperature of the gas from approximately 101° F. to approximately 383° F. Compression heating is an effect of high-speed compression and the use of the heat from the compression is part of the invention.

Component 8: Heat Exchanger: This is part of the new invention and recovers more heat (both sensible and latent) from the combustion product stream into the feedwater coming out of the condensate pump. This heat exchange is serving three purposes. First it is reducing the temperature of the combustion products so we will be able to condense vapors. Second it is recovering the heat from the temperature reduction (through both sensible and latent heat) of the combustion products into the feedwater (condensate at this point). Third, it is intercooling the compressor. Intercooling is used to increase compressor efficiency. It is easier to compress a cool gas than it is to compress a hot gas. We are cooling the gas and recovering that energy added as sensible heat by the compressor into the feedwater. The combustion product output, in this implementation, will be approximately 385 ton/hr and the liquid (predominately water at this point) output will be approximately 8 ton/hr.

Component 9: Compressor (Second stage). Here we increase the pressure which increases the partial pressure of all of the gas components. Our objective is, again, to increase the partial pressure of other condensable gases so when we reduce the temperature they will condense. In this stage of compression the pressure of the gas in the example increases from approximately 62.8 psia to approximately 276 psia. This compression also increases the temperature of the gas from approximately 118° F. to approximately 361° F.

Component 10: Heat Exchanger: This is part of the new invention and recovers more heat from the combustion product stream into the feedwater coming out of the condensate pump. This heat exchange is serving three purposes. First it is reducing the temperature of the combustion products so we will be able to condense vapors. Second it is recovering the heat from the temperature reduction of the combustion products in the feedwater (condensate at this point). Third, it is intercooling the compressor. In this heat exchanger the temperature of the stream is reduced from approximately 262° F. to approximately 123° F. Condensation will take place in this heat exchanger. Both sensible and latent heat will be recovered in this wet heat exchanger. The flow of gas out of the exchanger, in this implementation, will be approximately 382 ton/hr and the flow of liquid out of the exchanger will be approximately 3 ton/hr.

Component 11: Heat exchanger: This part of the invention conserves energy by using plant cooling water to intercool the compressor. This is shown as a second stage intercooling exchanger for dropping the temperature even lower. This exchanger uses circulating (cooling) water coming from the cooling water exit from the condenser. This water is at a lower temperature than the condensate and can drop the temperature of the gas lower so that the compression step will be more efficient. The temperature of the gas will be decreased from approximately 125° F. to approximately 100° F. in this heat exchanger. The gas flow out of the heat exchanger, in this implementation, will be approximately 381 ton/hr and the liquid flow will be approximately 1 ton/hr.

Component 12: Compressor (third stage). Here we, again, increase the pressure which increases the partial pressure of all of the gas components. Our objective is, again, to increase the partial pressure of other condensable gases so when we reduce the temperature they will condense. At this point the composition of the gas stream is approximately 91% $CO_2$ and only approximately 0.3% water vapor. Most of the water vapor as well as portions of the acid gases have been condensed out or entrained in the condensation at this point. In this stage of compression the pressure of the gas in the example increases from approximately 271 psia to approximately 1180 psia. This compression also increases the temperature of the gas from approximately 100° F. to approximately 347° F.

Component 13: Heat exchanger. This is part of the invention. This performs the first step in cooling of the compressed, heated, and dehydrated gas stream exiting compressor #14 using feedwater. The gas temperature drops from approximately 347° F. to approximately 236° F. in this heat exchanger while the feedwater temperature rises from approximately 223° F. to approximately 242° F. This heat exchanger is a dry exchanger (meaning it does not condense vapors), therefore, the heat picked up in the feedwater is predominantly sensible.

Component 14: Heat exchanger. This is part of the invention. This performs the second step in cooling of the compressed, heated, and dehydrated gas stream exiting compressor #14 using feedwater. The gas temperature drops from approximately 236° F. to approximately 199° F. in this heat exchanger while the feedwater temperature rises from approximately 195° F. to approximately 210° F. This heat exchanger is a dry exchanger (meaning it does not condense vapors), therefore, the heat picked up in the feedwater is sensible.

Component 15: Heat exchanger. This part of the invention uses circulating (cooling) water for the cooling fluid instead of one of the working fluids (such as feedwater or incoming oxygen) from the cycle. The water for cooling has to be cool enough to reduce the gas temperature to below the critical temperature for $CO_2$ so that the $CO_2$ will start condensing. The gas stream drops from approximately 199° F. to approximately 66° F. In this heat exchanger $CO_2$ starts condensing due to the high partial pressure and low temperature. In this implementation, there will be approximately 281.5 ton/hr of $CO_2$ condensed in this heat exchanger and approximately 0.5 ton/hr of the remaining water vapor removed here. The removal of significant amounts of liquid $CO_2$ here and the reduction of the temperature of the remaining gas means the compressor will not have to work nearly as hard at the next compression stage.

Component 16: Compressor (fourth stage). Here we, again, increase the pressure which increases the partial pressure of all of the remaining gas components. Our objective is, again, to increase the partial pressure of the remaining condensable gases so when we reduce the temperature they will condense. At this point the composition of the gas stream is approximately 70% $CO_2$ and the other components consist of $O_2$ (18%) and $N_2$ (11%). In this stage of compression the pressure of the gas in the example increases from approximately 1110 psia to approximately 2332 psia. This compression also increases the temperature of the gas from approximately 66° F. to approximately 178° F.

Component 17: Heat exchanger. This part of the invention uses circulating (cooling) water for the cooling fluid instead of one of the working fluids (feedwater or incoming oxygen) from the cycle. The water for cooling has to be cool enough to reduce the gas temperature to below the critical temperature for $CO_2$ so that the $CO_2$ will continue condensing. The gas stream drops from approximately 175° F. to approximately 75° F. Approximately 52 ton/hr. of $CO_2$ is removed as liquid at this stage. The removal of significant amounts of liquid $CO_2$ here and the reduction of the temperature of the remaining gas means the compressor will not have to work nearly as hard at the next compression stage.

Component 18: Compressor (fifth stage). Here we, again, increase the pressure which increases the partial pressure of all of the remaining gas components. Our objective is, again, to increase the partial pressure of the remaining condensable gases so when we reduce the temperature a portion of them will condense. At this point the composition of the gas stream is approximately 42% $CO_2$ and the other components include $O_2$ (37%) and $N_2$ (21%). In this stage of compression the pressure of the gas in the example increases from approximately 2286 psia to approximately 5143 psia. This compression also increases the temperature of the gas from approximately 75° F. to approximately 198° F.

Component 19: Heat exchanger. This part of the invention uses circulating (cooling) water for the cooling fluid instead of one of the working fluids (such as feedwater or incoming oxygen) from the cycle. The water for cooling has to be cool enough to reduce the gas temperature to below the critical temperature for $CO_2$ so that the $CO_2$ will continue condensing. The gas stream temperature drops from approximately 197° F. to approximately 79° F. The output gas (approximately 32.5 ton/hr) will consist of 21% $CO_2$, 50% $O_2$, and approximately 29% $N_2$. This gas output stream will be excellent feed for an air separation unit.

For consistency in table 11 below we use the "a" designation for heat exchangers to show what is normally referred to as the "hot side" of a heat exchanger (the fluid supplying heat). We use the "b" designation to represent the "cold side" (the fluid being heated). Also for the heat exchangers we use "i" to represent the incoming fluid and "ii" to represent the outflowing fluid. For compressors, splitters, or combiners we have use the "a" side to represent the fluid entering and the "b" side to representing the fluid leaving. If there is more than one fluid stream entering or leaving these components, they are designated by using "i", "ii", and "iii" to show the numbered streams. The following Table 11 illustrates FIG. 3.

TABLE 11

Components and conditions for FIG. 3.

| Component # and general description | Component detail # and description | Temperature (F) | Pressure (psia) | Flow Rate (ton/hr) |
|---|---|---|---|---|
| 1 Splitter | 1a Inlet exhaust stream (incoming gas stream) | 587 | 15 | 2014 |
| | 1b-i Outlet exhaust recirculation stream | 587 | 15 | 1547 |
| | 1b-ii Outlet exhaust bleed stream for processing | 587 | 15 | 467 |
| 2 Heat Exchanger | 2a-i Exhaust inlet (same stream as 1b-ii) | 587 | 15 | 467 |
| | 2a-ii Heat exchanger exhaust outlet | 428 | 14.9 | 467 |

TABLE 11-continued

Components and conditions for FIG. 3.

| Component # and general description | Component detail # and description | Temperature (F) | Pressure (psia) | Flow Rate (ton/hr) |
|---|---|---|---|---|
| | 2b-i Feedwater from drain of highest pressure heater | 410 | 2675 | 1297 |
| | 2c-ii Feedwater to economizer | 425 | 2621 | 1297 |
| 3 Heat Exchanger | 3a-i Exhaust inlet (same stream as 2a-ii) | | | |
| | 3a-ii Exhaust outlet | 322 | 14.7 | 467 |
| | 3b-i Feedwater inlet from deaerator pump | 310 | 2900 | 1297 |
| | 3b-ii Feedwater out to first high-pressure feedwater heater | 320.5 | 2842 | 1297 |
| 4 Heat Exchanger | 4a-i Exhaust inlet (same as stream 3a-ii) | 322 | 14.7 | 467 |
| | 4a-ii Exhaust outlet | 214 | 14.6 | 467 |
| | 4b-i Feedwater inlet from low temperature mixer (#5) | 203 | 139 | 607 |
| | 4b-ii | 224 | 136.5 | 607 |
| 5 Low temperature Mixer | 5a-i Input: Feedwater from booster pump draining the Low Pressure-Feed water heater (FWH-1) | 168 | 145 | 83 |
| | 5a-ii: Input from low temperature heat exchanger | 210 | 139 | 262 |
| | 5a-iii: Input from intercooling heat exchanger (#9) | 205 | 142 | 262 |
| | 5b: Output (same as 4b-i) | 203 | 139 | 607 |
| 6 Heat exchanger | 6a-i: Hot side input: Exhaust gas from Heat Exchanger 4 (same as stream 4a-ii) | 214 | 14.6 | 467 |
| | 6a-ii: Hot side output: Cooled exhaust gas (two phase flow with condensation in the heat exchanger) | 101 | 14.5 | 393 |
| | 6a-iii: Hot side liquid condensate out (both $H_2O$ and $H_2SO_4$) | 101 | 14.5 | 74 |
| | 6b-i: Input from cooling water booster pump. | 80 | 60 | 5,014 |
| | 6b-ii Output cooling water | 97 | 59 | 5,014 |
| 7 Compressor stage 1 | 7a: Input gas stream from Flash separator (#7). Same as Stream 7b-i | 101 | 14.5 | 393 |
| | 7b: Output gas stream from compressor | 334 | 63.5 | 393 |
| 8 Intercooling heat exchanger | 8a-i: Input: Compression heated stream from compressor (#8) (same as stream 8b.) | 334 | 63.5 | 393 |
| | 8a-ii (exhaust gas out) | 118 | 62.8 | 385 |
| | 8a-iii (liquid out) | 118 | 62.8 | 8 |
| | 8b-i | 102 | 145 | 262 |
| | 8b-ii (Same as stream 5a-iii) | 205 | 142 | 262 |
| 9 Compressor stage 2 | 9a: Input gas stream from Intercooling heat exchanger (#8) same as stream 8a-ii | 118 | 62.8 | 385 |
| | 9b: Output from compressor stage 2 (same as 10a-i) | 361 | 276 | 385 |
| 10 Intercooling heat exchanger | 11a-i: Input: from Compressor stage 2 (same as stream 9b) | 361 | 276 | 385 |
| | 11a-ii: Output hot side exhaust gas | 125 | 274 | 382 |
| | 10a-iii: Output (liquid) | 125 | 274 | 3 |
| | 10b-i: Input cold side split form feedwater booster pump | 102 | 145 | 262 |
| | 10b-ii: Output of feedwater | 195 | 142 | 262 |
| 11 Intercooling heat exchanger | 11a-i: Input from Intercooling heat exchanger (#10) to sub-cool $CO_2$. Same as stream 11a-ii. | 125 | 274 | 382 |
| | 11a-ii: Output gas stream | 100 | 271 | 381 |
| | 11a-iii: Output liquid stream | 100 | 271 | 1 |
| | 11b-i | 96.6 | 59 | 5014 |
| | 11b-ii | 97.2 | 58 | 5014 |
| 12 Compressor (stage 3) | 12a: Input (same as stream 11b-i) | 100 | 271 | 381 |
| | 12b: Output (same as stream 13a-i) | 347 | 1180 | 381 |
| 13 Intercooling heat exchanger | 13a-i: Input (same as stream 12b) | 347 | 1180 | 381 |
| | 13a-ii: Output | 236 | 1157 | 381 |
| | 13b-i: Input cooling stream from heat exchanger (#4) same as stream 4b-ii. | 223 | 137 | 607 |
| | 13b-ii: Output | 242 | 134 | 607 |
| 14 Heat Exchanger | 14a-i: Input compressed exhaust gas (same as stream 13a-ii) | 236 | 1157 | 381 |
| | 12a-ii: Output | 199 | 1133 | 381 |
| | 14b-i: Input condensate from heat exchanger 11 (same as 10b-ii) | 195 | 142 | 262 |
| | 14b-ii: Output | 210 | 139 | 262 |
| 15 Heat exchanger | 15a-i: Same as 16a-ii | 199 | 1133 | 381 |
| | 15a-ii: Output of gases | 66 | 1111 | 99 |
| | 15a-iii: Output of liquids (0.5 ton/hr water and 281.5 ton/hr $CO_2$) | 66 | 1111 | 282 |
| | 15b-i: Input | 60 | 50 | 5571 |
| | 15b-ii: | 66 | 49 | 5571 |
| 16 Compressor | 16a: Input (Same as 15b-i) | 66 | 1110 | 99 |
| | 16b: Output | 178 | 2332 | 99 |
| 17 Heat exchanger | 17a-i: Input (Same as 16b) | 175 | 2332 | 99 |
| | 17a-ii: Output gases | 75 | 2285 | 47 |
| | 17a-iii: Output liquids (Only a small amount (0.05 ton/hr) water and approximately 52 ton/hr $CO_2$. | 75 | 2285 | 52 |
| | 17b-i: Input (same as 15b-ii) | 66 | 49 | 5571 |
| | 17b-ii: Output | 67 | 48 | 5571 |
| 18 Compressor | 18a: Input (same as 21b-i) | 75 | 2286 | 47 |
| | 18b: Output | 198 | 5143 | 47 |
| 19 Heat exchanger | 19a-i: Input (same as 18b) | 197 | 5143 | 47 |
| | 19a-ii: Output | 79 | 5040 | 32.5 |

TABLE 11-continued

Components and conditions for FIG. 3.

| Component # and general description | Component detail # and description | Temperature (F) | Pressure (psia) | Flow Rate (ton/hr) |
|---|---|---|---|---|
| | 19a-iii: Output liquid ($CO_2$) | 79 | 5040 | 14.5 |
| | 19b-i: Input (same as 17b-ii) | 67 | 48 | 5571 |
| | 19b-ii: Output | 67.5 | 47 | 5571 |

A discussion of each item in FIGS. 3a and 3b follows:

1) Exhaust stream splitter
   a. 1 input which is the exhaust after heating the incoming oxygen and recirculated flue gas.
   b. 2 output streams
      i. The main recirculation stream
      ii. Bleed stream for processing
2) Heat exchanger
   a. Hot side
      i. Inlet (Exhaust gas from splitter) (same as 1 b-ii)
      ii. Outlet: Cooler exhaust gas exit
   b. Cold side
      i. Inlet (drain from highest pressure feedwater heater)
      ii. Outlet feedwater return to economizer
3) Heat exchanger
   a. Hot side
      i. Inlet (exhaust after outlet from heat exchanger 2—same as 2a-ii)
      ii. Outlet: Cooler exhaust gas exit.
   b. Cold side
      i. Feedwater from deaerator
      ii. Outlet: feedwater return to first high-pressure feedwater heater
4) Heat exchanger
   a. Hot side
      i. Inlet: Exhaust gas from heat exchanger 3
      ii. Outlet
   b. Cold side
      i. Inlet from mixer 5
      ii. Outlet
5) Mixer
   a. Inlet
      i. Feedwater from feedwater heater 1 (FWH-1) drain
      ii. Condensate that has been heated first in heat exchanger 11, then in heat exchanger 16.
      iii. Condensate that has been heated in heat exchanger 9.
   b. Outlet: Mixed feedwater (feedwater is the same as condensate).
Condensate is what it is usually called when it comes out of the condenser and before it is sent through the feedwater heating loop).
6) Heat exchanger
   a. Hot side
      i. Inlet: Exhaust gas from heat exchanger 4.
      ii. Outlet
   b. Cold side
      i. Inlet: Cooling water from the cooling water booster pump.
      ii. Outlet: heated cooling water
7) Compressor first stage: Compression ratio of approximately 4.4
   a. Input
   b. Output compressed and compression exhaust stream
8) Heat exchanger: "Intercooler" between stages 1 and 2 of the compression system.
   a. Hot side
      i. Input: Compression heated gas
      ii. Output: Cooled gas stream
   b. Cold side
      i. Input: Condensate
      ii. Heated condensate
9) Compressor second stage: Compression ratio of approximately 4.4
   a. Input cooled exhaust gas stream
   b. Output heated exhaust stream
10) Heat exchanger: intercooler/condenser. It will be obvious to those skilled in the art that condensation can take place wherever the exhaust stream drops below the dew point of condensables in the stream.
    a. Hot side
       i. Input: Compressed, heated exhaust gas coming from the second stage compressor.
       ii. Output: Cooled, compressed exhaust gas.
    b. Cold side
       i. Input: Condensate coming from the condenser
       ii. Output: Heated condensate
11) Heat exchanger: Intercooler/condenser
    a. Hot side:
       i. Input: Compressed heated gas that has passed through heat exchanger #11 and has been cooled using condensate as a first cooling stage.
       ii. Output: Compression heated gas that has been further cooled using cold circulating water that has already been used to cool the power plant condenser.
    b. Cold Side:
       i. Input: Circulating water that has been used to cool the power plant condenser. This is a second cooling stage for the exhaust gas.
       ii. Output: Cooled exhaust gas.
12) Compressor: Compression ratio approximately 4.36
    a. Input: Exhaust gas stream with condensed components removed. (same as stream 13b-i).
    b. Output: Exhaust gas stream which has been further compressed and compression heated.
13) Heat exchanger/intercooler
    a. Hot side
       i. Input: Compressed heated exhaust gas coming from compressor
       ii. Cooled compressed exhaust gas.
    b. Cold side
       i. Input: Mixed feedwater and condensate coming from mixer 5 that has already been preheated in heat exchanger #4.
       ii. Output: Heated condensate.
14) Heat exchanger/intercooler
    a. Hot side:
       i. Input: Cooled compressed exhaust gas (same as stream 15a-ii)
       ii. Output: Further cooled compressed exhaust gas.
    b. Cold side
       i. Input: Condensate that has been preheated in heat exchanger 11 same as stream 11b-ii)
       ii. Output: Heated condensate 15) Heat exchanger/intercooler
   a. Hot side:
      i. Input: Cooled compressed exhaust gas (same as stream 16a-ii)
      ii. Output: Further cooled compressed exhaust gas
   b. Cold side:
      i. Input: Circulating water taken from the intake side of the condenser where it is cooler than on the output side of the condenser.
      ii. Output: Heated circulating water.
16) Compressor: Third stage compression, approximately 2.1 compression ratio.
   a. Input: same as stream 18a-l
   b. Output after compression
17) Heat exchanger/intercooler
   a. Hot side
      i. Input: Hot compressed exhaust gas
      ii. Output cooler compressed exhaust gas
   b. Cold side
      i. Input: circulating water which has passed through heat exchanger #17 (same as stream 17b-ii)
      ii. Output
18) Compressor: approximate compression ratio 2.25
   a. Input: Cooled and compressed exhaust gas
   b. Output: Higher compression hot gas
19) Heat exchanger
   a. Hot side
      i. Hot compressed exhaust gas
      ii. Cooled compressed exhaust gas
   b. Cold side
      i. Circulating water coming through two heat exchangers (#17 and #20). (Same as stream 20b-ii)
      ii. Heated circulating water Although a coal-fired boiler was used as an example in this implementation of a combustion unit other comparable equipment may be substituted, such as a combustion turbine, as known to a person of ordinary skill in this art. Steam turbine cycles can be similar to a Rankine cycle, a regenerative cycle or a reheat cycle. Also, fossil fuels such as gas and oil, or biomass, or combustible waste material, or other combustibles may be substituted with different pollutants being produced from each. Coal, for instance, has fine particulate matter as well as various heavy metals, such as Hg, all as well known in the art. In the examples used herein, the recycled stream can be up to about a 90% by volume of the combustion products and the remediation or bleed stream up to about 40% by volume. Generally, the added oxygen is between about 40% to about greater than 99% pure, and more specifically more than about 80% pure. The thermodynamic working fluids, preferably, are water or other than water including hydrocarbons such as hexane, or others such as one or more of ammonia, $CO_2$ or a halogenated hydrocarbon.

While there has been disclosed what is considered to be the preferred embodiment of the present invention, it is understood that various changes in the details may be made without departing from the spirit, or sacrificing any of the advantages of the present invention. The embodiments of the invention in which an exclusive property or privilege is claimed are defined as follows.

We claim:

1. A method of remediating and recovering energy from combustion products from a fossil fuel power plant having at least one fossil fuel combustion chamber, at least one compressor, at least one turbine, at least one heat exchanger, and a source of oxygen, said power plant producing combustion products including non-condensable gases including oxygen, argon, and nitrogen and condensable vapors including water vapor and acid gases including $SO_x$ and $NO_x$ and $CO_2$ and pollutants and recovering energy during the remediation and which recycles the combustion products and adds oxygen to support combustion, comprising:

changing the temperature/pressure relationship of the combustion products by cooling, through heat exchange with thermodynamic working fluids in the power generation cycle and/or compressing and/or heating and/or expanding the combustion products to a temperature/pressure relationship below the dew point of at least some of the condensable vapors to condense liquid having some acid gases dissolved therein from the combustion products and to dissolve some of the pollutants therein thereby partially to remediate the combustion products while recovering heat from the combustion products through heat exchange between the combustion products and thermodynamic working fluids and/or cooling fluids used in the power generating cycle, repeating one or more of cooling and/or compressing and/or heating and/or expanding with condensation and separation of condensable vapors and acid gases and recovery of heat through heat exchange, and condensation thereby reducing the energy required for continued compression, until the partially remediated stream is $CO_2$, $SO_x$, and $H_2O$ poor and oxygen enriched, and thereafter sending the $CO_2$, $SO_x$, and $H_2O$ poor and oxygen enriched partially remediated stream to an exhaust and/or and/or the turbine, whereby either or both of the energy of compression and the temperature of the expanded $CO_2$, $SO_x$, and $H_2O$ poor and oxygen enriched remediation stream is reduced, such that if the remediation stream is expanded through the turbine additional cooling condenses more of the remaining condensable gases and expansion captures additional energy, additional condensable vapors are condensed and/or energy required for separation is reduced, or the $CO_2$ $SO_x$ and $H_2O$ poor and oxygen rich remediation stream is exhausted to the atmosphere.

2. The method set forth in claim 1, wherein not less than about 50% by volume of the combustion products are recycled to the combuster with sufficient added oxygen to maintain the volume of gas in the combuster substantially constant.

3. The method set forth in claim 2, wherein the oxygen added to the recycled combustion gases is not less than 40% pure oxygen.

4. The method set forth in claim 2, wherein the oxygen added to the recycled combustion gases is not less than 80% pure oxygen.

5. The method set forth in claim 1, wherein the source of oxygen is an air separation unit.

6. The method set forth in claim 1, wherein a portion of the combustion products are removed and replaced with not less than about a stoichiometric amount of oxygen to support combustion of the combustion products.

7. The method set forth in claim 2, wherein the added oxygen is preheated by heat exchange with combustion products.

8. The method set forth in claim 7, wherein the combustion products used to preheat the added oxygen include the portion removed to be replaced by the added oxygen.

9. The method set forth in claim 1, wherein the thermodynamic working fluid is other than water.

10. The method set forth in claim 9, wherein the thermodynamic working fluid is selected from the group consisting of hexane, ammonia, $CO_2$ and a halogenated hydrocarbons.

11. The method set forth in claim 1, wherein the fossil fuel combustion chamber is a boiler.

12. The method set forth in claim 1, wherein the fossil fuel combustion chamber is a combustion turbine.

13. The method set forth in claim 1, wherein the power generation cycle is a steam turbine cycle.

14. The method set forth in claim 13 wherein the fluid used to cool the flue gas is feedwater.

15. The method set forth in claim 14 wherein the heat transferred is sensible heat.

16. The method set forth in claim 14 wherein the heat transferred is latent heat.

17. The method set forth in claim 14 wherein the heat transferred is both sensible and latent.

18. The method set forth in claim 13, wherein the steam turbine cycle is a Rankine cycle.

19. The method set forth in clam 13, wherein the steam turbine cycle is a regerative cycle.

20. The method set forth in claim 13, wherein the steam turbine cycle is a reheat cycle.

21. The method set forth in claim 13, wherein the working thermodynamic fluid is other than water.

22. The method set forth in claim 1, wherein the fossil fuel is coal and the pollutants include fine particulate matter and/or heavy metals.

23. The method set forth in claim 1, wherein the fossil fuel is oil and the pollutants include tine particulate matter and/or heavy metals.

24. The method set forth in claim 1, wherein the fossil fuel is natural gas.

25. A method of remediating and recovering energy from combustion products from a fossil fuel power plant having at least one or more of a fossil fuel combustion chamber, at least one compressor, at least one turbine, at least one heat exchanger and, a source of oxygen, said power plant producing combustion products including non-condensable gases including oxygen, argon, and nitrogen and condensable vapors including water vapor and acid gases including $SO_X$ and $NO_X$ and $CO_2$ and pollutants and recovering energy during the remediation and which recycles the combustion products and adds oxygen to support combustion, comprising:

splitting the combustion products into a recycle stream and a remediation stream wherein the remediation stream is up to about 70% by volume of the combustion products and the recycle stream is up to about 90% by volume of the combustion products, adding sufficient oxygen to the recycle stream to support combustion and recycling the oxygenated recycle stream to the combustion chamber for combustion, changing the temperature/pressure relationship of the remediation stream by cooling, through heat exchange with thermodynamic working fluids in the power generating cycle and/or compressing and/or heating and/or expanding the remediation stream to a temperature/pressure combination relationship below the dew point of at least some of the condensable vapors to condense liquid having some add gases dissolved therein from the remediation stream and to dissolve some of the pollutants therein thereby partially to remediate the remediation stream while recovering heat from the remediation stream through heat exchange between the remediation stream and thermodynamic working fluids in the power generating cycle, repeating one or more of cooling and/or compressing and/or heating and/or expanding with condensation and separation of condensable vapors and acid gases and recovery of heat, and condensation, thereby reducing the energy required for continued compression, until the remediation stream is $CO_2$ and $H_2O$ poor and oxygen enriched, and thereafter sending the $CO_2$ and $H_2O$ poor and oxygen enriched remediation stream to one or more of an exhaust, and the turbine, whereby either or both of the energy of compression and the temperature of the expanded $CO_2$ and $H_2O$ poor and oxygen enriched remediation stream is reduced, such that the remediation stream is expanded through the turbine, additional cooling condenses more of the remaining condensable gases, or the remediation stream is sent to an air separation unit additional condensable vapors are condensed and/or energy required for separation is reduced, or the $CO_2$ and $H_2O$ poor and oxygen rich remediation stream is exhausted to the atmosphere.

26. The method set forth in claim 25, wherein the added oxygen is not less than about 40% and up to about 99.999% pure.

27. The method set forth in clam 25, wherein not less than about a stoichiometric amount of oxygen is added to support combustion of the combustion products and is preheated by heat exchange with the combustion products.

28. The method set forth in claim 25, wherein the thermodynamic working fluid is one or more of hexane, ammonia, $CO_2$ or a halogenated hydrocarbon.

29. The method set forth in claim 25 wherein the fossil fuel is coal and the pollutants include fine particulate matter and heavy metals.

30. The method set forth in claim 25, wherein the remediation stream exhausted to the atmosphere is substantially free of $CO_2$ and $H_2O$.

31. A method of remediating and recovering energy from flue gas combustion products from a fossil fuel power plant having a boiler and at least one compressor, at least one turbine, at least one heat exchanger and, an air separation unit as a source of oxygen, said boiler producing flue gas combustion products having non-condensable gases including oxygen, argon, and nitrogen and condensable vapors including water vapor and acid gases including $SO_X$ and $NO_X$ and $CO_2$ and pollutants and recovering energy during the remediation and which recycles the combustion products and adds oxygen to support combustion, comprising:

splitting the flue gas combustion products into a recycle stream and a remediation stream wherein the remediation stream is up to about 30% by volume of the flue gas combustion products and the recycle stream is up to about 90% by volume of the flue gas combustion products, adding sufficient oxygen to the recycle stream to support combustion and recycling the oxygenated recycle stream to the boiler for combustion, changing the temperature/pressure relationship of the remediation stream by cycles of cooling, through heat exchange with thermodynamic working fluids in the power generation cycle, and/or compressing and/or heating and/or expanding the remediation stream to a temperature/ pressure combination relationship below the dew point of water vapor to condense liquid having some add gases dissolved therein from the remediation stream and to entrain some of the fine particulate matter therein thereby partially to remediate the remediation stream while recovering heat from the remediation stream through heat exchange between the remediation stream and thermodynamic working fluids in or after the power generating cycle, repeating one or more of the cooling and/or compressing and/or heating and/or expanding cycles with condensation and separation of water vapor and acid gases and recovery of latent and/or sensible heat until the remediation stream is $CO_2$ and $H_2O$ poor and oxygen enriched, and thereafter sending the $CO_2$ and $H_2O$ poor and oxygen enriched remediation stream to at least one air separation unit and a turbine, whereby either or both of the energy of compression and the temperature of the expanded $CO_2$ and $H_2O$ poor and oxygen enriched remediation stream is reduced, such that when the remediation stream is expanded though the turbine, additional cooling condenses more of the remaining condensable gases and expansion captures additional energy, or if the remediation stream is sent to the air separation unit additional condensable vapors am condensed and/or energy required for separation is reduced, or the CO, $SO_X$ and $H_2O$ poor and oxygen rich remediation stream is exhausted to the atmosphere.

32. A method of remediating and recovering energy from flue gas combustion products from a fossil fuel power plant having a boiler and at least one compressor, at least one turbine, at least one heat exchanger and, a source of oxygen, said boiler producing flue gas combustion products having non-condensable gases including oxygen, argon, and nitrogen and condensable vapors including water vapor and acid gases including $SO_X$ and $NO_X$ and $CO_2$ and pollutants and recovering energy during the remediation and which recycles the combustion products and adds oxygen to support combustion, comprising:

splitting the flue gas combustion products into a recycle stream and a remediation stream wherein the remediation stream is up to about 30% by volume of the flue gas combustion products and the recycle stream is up to about 90% by volume of the flue gas combustion products, preheating an oxygen containing stream by passing the oxygen containing stream in heat exchange relationship with the flue gas combustion products or mixing the oxygen with the recycled flue gas stream, adding sufficient oxygen from the preheated oxygen containing stream to the recycle stream to support combustion and recycling the oxygenated recycle stream to the boiler for combustion, initially cooling the remediation stream, below the dew point of water vapor to condense not less than about 80 mole percent of the water vapor along with dissolved and/or entrained acid gases and particulate matter and heavy metals, thereafter changing the temperature and pressure of the remediation steam by one or more cycles of cooling and/or compressing and/or heating and/or expanding the remediation stream to a temperature/pressure combination below the dew point of water vapor to condense liquid having additional acid gases dissolved therein from the remediation stream and to entrain additional fine particulate matter therein repeating at least one cooling and/or compressing and/or heating and/or expanding cycles with condensation and separation of water vapor and acid gases and recovery of heat until the remediation stream is $CO_2$, $SO_X$ and $H_2O$ poor and oxygen enriched, and thereafter sending the $CO_2$, $SO_X$ and $H_2O$ poor and oxygen enriched remediation stream to at least one turbine, whereby either or both of the energy of compression and the temperature of the expanded $CO_2$, $SO_X$ and $H_2O$ poor and oxygen enriched remediation stream is reduced, such that when the remediation stream is expanded through a turbine, additional cooling condenses more of the remaining condensable gases and expansion captures additional energy, or the remediation stream is sent to an air separation unit results in additional condensable vapors condensed and/or energy required for separation is reduced, or the $CO_2$ and $H_2O$ poor and oxygen rich remediation stream is exhausted to the atmosphere.

* * * * *